(12) United States Patent
Jalan et al.

(10) Patent No.: US 8,051,201 B2
(45) Date of Patent: Nov. 1, 2011

(54) METHOD FOR PROVIDING SCALABLE MULTICAST SERVICE IN A VIRTUAL PRIVATE LAN SERVICE

(75) Inventors: Rajkumar Jalan, Saratoga, CA (US); Louis Yun, Los Altos, CA (US); Ivy Pei-Shan Hsu, Pleasanton, CA (US)

(73) Assignee: Foundry Networks, LLC, San Jose, CA (US)

( * ) Notice: Subject to any disclaimer, the term of this patent is extended or adjusted under 35 U.S.C. 154(b) by 0 days.

(21) Appl. No.: 12/709,338

(22) Filed: Feb. 19, 2010

(65) Prior Publication Data

US 2010/0220723 A1   Sep. 2, 2010

Related U.S. Application Data

(63) Continuation of application No. 10/632,484, filed on Aug. 1, 2003, now Pat. No. 7,698,455.

(51) Int. Cl.
G06F 15/173    (2006.01)
G06F 15/16     (2006.01)

(52) U.S. Cl. .................. 709/238; 709/236; 709/246
(58) Field of Classification Search ................ None
See application file for complete search history.

(56) References Cited

U.S. PATENT DOCUMENTS

| | | |
|---|---|---|
| 6,560,236 B1 | 5/2003 | Varghese et al. |
| 6,640,251 B1 | 10/2003 | Wiget et al. |
| 6,839,348 B2 | 1/2005 | Tang et al. |
| 7,606,939 B1 | 10/2009 | Finn |
| 7,698,455 B2 | 4/2010 | Jalan et al. |
| 2002/0019875 A1 | 2/2002 | Garrett et al. |
| 2002/0026268 A1 | 2/2002 | Navas |
| 2003/0037163 A1 | 2/2003 | Kitada et al. |
| 2003/0142674 A1 | 7/2003 | Casey |
| 2004/0037279 A1* | 2/2004 | Zelig et al. ................ 370/390 |
| 2004/0165600 A1 | 8/2004 | Lee |
| 2004/0174887 A1 | 9/2004 | Lee |
| 2004/0184408 A1 | 9/2004 | Liu et al. |

OTHER PUBLICATIONS

Meyer, RFC2365, Jul. 1998.*
Braudes et al., RFC1458, May 1993.*
Ballardie, "Core Based Trees (CBT) Multicast Routing Architecture," Sep. 1997, 15 pages, RFC 2201, Network Working Group.
Kompella, et al., "Virtual Private LAN Service," Nov. 2001, 11 pages, Version 00, at URL: http://www.ietf.org/.
Kompella, et al., "Decoupled Virtual Private LAN Service," Nov. 2001, 14 pages, Version 01, at URL: http://www.ietf.org.
Lasserre, et al., "Virtual Private LAN Services over MPLS," Sep. 2002, 19 pages, Version 01, at URL: http://www.ietf.org/.
Lasserre, et al., "Virtual Private LAN Services over MPLS," Sep. 2002, 24 pages, Version 02, at URL: http://www.ietf.org/.

(Continued)

*Primary Examiner* — Wen-Tai Lin
(74) *Attorney, Agent, or Firm* — Kilpatrick Townsend & Stockton LLP

(57) ABSTRACT

Multicast capability in a virtual private LAN service (VPLS) is provided in a provider IP/MPLS infrastructure without headend replications by encapsulating a customer data packet to use an established multicast protocol, such as IP multicast. In one example, the customer data packet is encapsulated by an IP header having an IP multicast group address and an Ethernet header. In one implementation, a DNS type mechanism is provided to distribute the IP multicast addresses for VPLS use. Such IP multicast group address can be set aside from an administratively scoped address range. An efficient IP routing algorithm running on the provider's network provides an efficient distribution tree for routing IP-encapsulated customer packet for the VPLS.

19 Claims, 2 Drawing Sheets

OTHER PUBLICATIONS

Meyer, "Administratively Scoped IP Multicast," Jul. 1998, 8 pages, RFC-2365, The Internet Society, at URL: http://www.ietf.org/rfc/rfc2365.txt.

Non-Final Office Action for U.S. Appl. No. 10/632,484, mailed on Jun. 8, 2007, 12 pages.

Final Office Action for U.S. Appl. No. 10/632,484, mailed on Mar. 4, 2008, 14 pages.

Non-Final Office Action for U.S. Appl. No. 10/632,484, mailed on Dec. 15, 2008, 23 pages.

Final Office Action for U.S. Appl. No. 10/632,484, mailed on Aug. 10, 2009, 12 pages.

Notice of Allowance for U.S. Appl. No. 10/632,484, mailed on Dec. 1, 2009, 8 pages.

* cited by examiner

METHOD FOR PROVIDING SCALABLE MULTICAST SERVICE IN A VIRTUAL PRIVATE LAN SERVICE

CROSS-REFERENCES TO RELATED APPLICATIONS

The present application is a continuation of U.S. application Ser. No. 10/632,484, filed Aug. 1, 2003, now U.S. Pat. No. 7,698,455 and entitled "Method for Providing Scalable Multicast Service in a Virtual Private LAN Service," the entire contents of which are incorporated herein by reference for all purposes.

BACKGROUND OF THE INVENTION

1. Field of the Invention

The present invention relates to providing virtual private network (VPN) service in a managed network environment (e.g., a service provider's routed backbone network that spans a large geographical area). In particular, the present invention relates to providing a multicasting capability in a virtual private LAN service (VPLS) implemented in such an environment.

2. Discussion of the Related Art

Virtual Private LAN service (VPLS) is an emerging standard aimed at providing a multipoint-to-multipoint service to connect multiple local area networks (LANs) or virtual LANs (VLANs) that are dispersed over a large geographical area. Ideally, the VPLS is transparent, such that all the connected LANs appear to be part of the same LAN. A typical VPLS is built using the infrastructure of a service provider's wide area network[1] (WAN). Traffic of such a WAN is typically handled using the Internet Protocol/Multi-Protocol Labeled Switching (IP/MPLS) routing protocols. FIG. 1 shows the reference topology of a network that supports a proposed VPLS service. As shown in FIG. 1, VPLS network 100 includes customer edge (CE) device 101-1 to 101-n, each connected to one or more LANs. The LANs connected to CE device 101-1 to 101-n are often located at sites that are separated from each other over great geographical extents. Each of CE devices 101-1 to 101-n is connected to a provider edge (PE) device (i.e., one of PE devices 103-a to 103-n), which provides connectivity between the CE devices over the IP/MPLS infrastructure over WAN 102.

[1] For our purpose, wide area network includes all non-local area networks, such as "metro area network."

At present, two VPLS standards have been proposed: (a) "Draft Kompella," available at the Internet Engineering Task Force (IETF) website (http://www.ietf.org), and (b) "Draft Lasserre-Vkompella," also available at the IETF website. Under one proposal, each PE device provides Layer 2 connectivity service by serving as a bridge between its associated CE device or devices and an emulated LAN interface. The emulated LAN interface allows devices attached to different CE devices to communicate with each other using, for example, Ethernet media access control (MAC) addresses. In essence, PE devices 103-1 to 103-n and WAN 102 together form a hub device. Traffic between PE devices can be handled using, for example, point-to-point MPLS virtual circuit (VC) labeled switched paths (LSPs) (i.e., "pseudo-wires"). Such an LSP may be implemented as a virtual circuit within an MPLS tunnel LSP. This process is illustrated, for example, in FIG. 2, where customer packet 201 is encapsulated by an MPLS overhead 202 that includes an MPLS tunnel identifier 202a and virtual circuit identifier 202b.

When a PE device receives a customer packet from an associated CE device, the PE device looks up a forwarding information base (FIB) to determine if the destination device specified in the customer packet is a known device. If the destination device is a known device, the FIB maps an VC-LSP that connects the receiving PE device to a destination PE device. The destination PE device is the PE device that is connected to the CE to which the destination device is attached. The emulated LAN interface then provides the proper encapsulation to the customer packet, and transmits the encapsulated packet over the mapped LSP. If the destination device is not known or if it is a multicast, the customer packet is replicated and the copies are sent to all PE devices associated with that VPLS. In the case of an unicast to an unknown destination device, when the destination device acknowledges, the LSP or LSPs associated with the MAC address are learned.

The benefits of VPLS are numerous. For example, VPLS allows the service provider to provide multiple services on the same managed network, e.g., IP unicast and multicast access, point-to-point virtual circuits and point-to-multipoint VPNs. From the service provider's viewpoint, because encapsulation occurs at the PE devices, only the PE devices are required to learn the MAC addresses within the customer LANs or VLANs, and it is required only to learn those MAC addresses associated with the VPLS with which the PE device is associated. In addition, the well-developed tools for MPLS traffic engineering and LSP load balancing afford the service provider great flexibility in tailoring quality-of-service (QoS) and service level agreements (SLAs) for the VPLS consistent with its network resource allocation objectives.

VPLS is thus very efficient in handling customer point-to-point unicast traffic. As to customer multicast traffic, however, even though only those PE devices that are interfaced to participants of the multicast (i.e., CE devices of the VPLS that are involved in the multicast) need to receive the replicated packet, both proposed VPLS standard require that all PE devices receive the replicated packet. Of even more serious consequence, the frequent unnecessary replications ("head-end replications") is an inefficiency that erodes the available bandwidth.

Accordingly, a scalable VPLS multicast capability is desired.

SUMMARY

The present invention provides, in a virtual private LAN service (VPLS) implemented on a service provider's network, a method for providing a multicast capability for a customer packet. The method of the present invention encapsulates, at a provider edge device associated with the VPLS, each customer packet of the VPLS in a service provider packet in accordance with a data communication protocol having a native multicast capability. Using the native multicast capability, the service provider packet is transmitted over the service provider's network using the native multicast capability of the data communication protocol from the provider edge device to other provider edge devices associated with the VPLS. Upon receiving the service provider packet, each of the other provider edge devices associated with the VPLS recovers the customer packet. The service provider packet includes an encapsulating header that provides a unique identifier under the communication protocol that is assigned to be associated with the VPLS.

In accordance with one embodiment of the present invention, the Internet Protocol (IP) is selected to be the data communication protocol having the native multicast capability used for the VPLS. In that embodiment, the unique identifier assigned to the VPLS may be an IP multicast group address, which is selected from a range set aside by the service provider for use with VPLS's. The range set aside by the service provider may be selected from a range having an administrative scope local to the service provider's network. Using the IP protocol has the added advantage that distribution of the IP multicast group address may be accomplished using a name service, such as the domain name system (DNS).

The present invention is applicable to Layer 2 virtual private network (VPN) services implemented on a service provider network.

The present invention is particularly applicable to a VPLS that is implemented in the service provider's network using an Internet Protocol/Multi-protocol label switching service. In such a VPLS, the method according to present invention avoids head-end replications of the customer packet required under existing proposed VPLS standards. Further, using the multicast capability of a communication protocol having a native multicast capability to provide multicasting for the VPLS, according to the present invention, a VPLS can also benefit from established infrastructures of the communication protocol, such as a name service or a routing protocol optimized for the communication protocol. For example, in an embodiment using IP as the communication protocol for the service provider packet of the VPLS, efficient routing of the service provider packet for the VPLS can be achieved using a source-based protocol, such as Protocol Independent Multicast-Dense Mode (PIM-DM) or Distance Vector Multicast Routing Protocol (DVMRP), or a core-based protocol, such as Protocol Independent Multicast-Sparse Mode (PIM-SM). These routing protocols typically provide an efficient distribution tree for delivering the service provider packet.

Security is enhanced for a method of the present invention, if the service provider network only accepts for routing any packet that resembles the structure of the service provider packet for the VPLS originating from the provider edge devices associated with the VPLS. Under such an arrangement, a customer cannot spoof such a service provider packet inadvertently or maliciously, thus avoiding the possibility of a denial of service (DoS) attack should such spoofing occur.

The present invention is better understood upon consideration of the detailed description below and the accompanying drawings.

DETAILED DESCRIPTION OF THE PREFERRED EMBODIMENTS

One possible solution to the headend replication problem would be to have the PE device receiving a customer multicast packet, or an unknown unicast packet, from an associated CE device to forward the MPLS encapsulated customer packet to its adjacent peer PE device or devices. (For the purpose of this detailed description and the appended claims, the term "multicast" encompasses also broadcast.) Each PE device receiving a forwarded encapsulated packet, need only provide the packet to its associated CE device or devices, and forward the encapsulated packet to its adjacent peer PE device or devices. This process repeats until all PE devices are reached. This solution, however, requires modifications to the existing proposed VPLS standards, for which there are at least two reasons. First, there is currently no standard-based MPLS method for multicasting MPLS-labeled packets. Second, at least one proposed VPLS standard forbids forwarding VPLS packets amongst peer PE devices to prevent looping.

Figure 3:
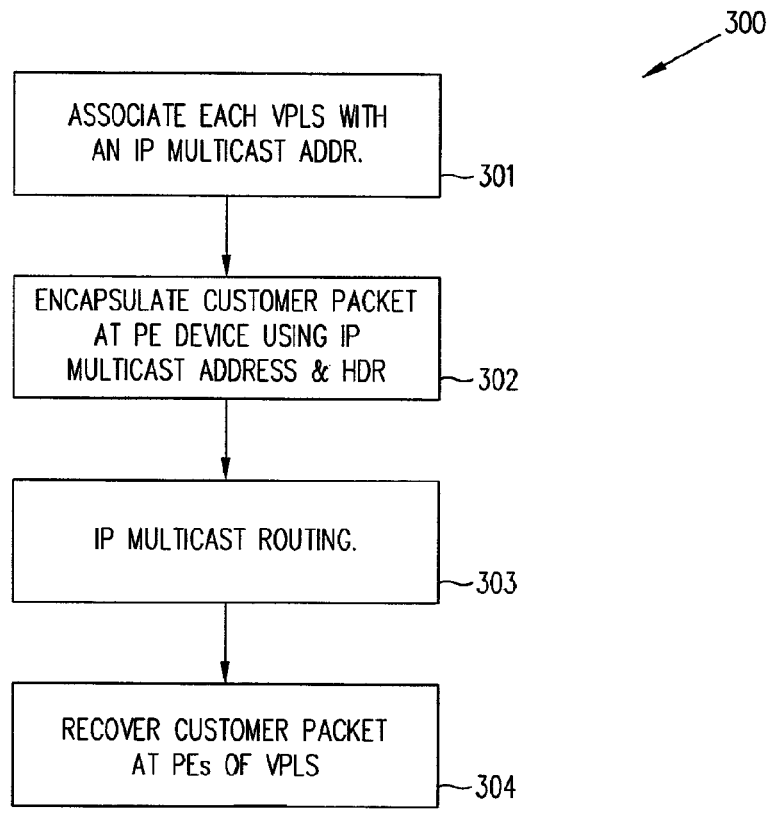
FIG. 3 shows flow chart 300 representing a VPLS multicast method according to one embodiment of the present invention.

The present invention provides a second VPLS multicast method using the well-established multicast mechanisms available under the Internet Protocol (IP). FIG. 3 shows flow chart 300 representing a VPLS multicast method according to one embodiment of the present invention. As shown in FIG. 3, at step 301, the method of the present invention associates each VPLS with a unique IP multicast group address. In a multi-service provider network, where the provider may provide both L2 VPN service (which may be implemented by VPLS) and native IP multicast service, a special set of IP multicast group addresses is set aside for implementing VPLS multicast to avoid a conflict with a customer's native IP multicast group addresses. In one implementation, an administratively scoped address range allocated by the Internet Assigned Numbers Authority (IANA), such as 239.0.0.0/25, can be set aside for VPLS multicast. The scope of this address space is limited to a private multicast domain, i.e., limited to the service provider's domain, and thus can be reused in other regions of the global network.

One method that allows customers' native IP multicast group addresses to exist with VPLS multicast is to declare the entire 239.0.0.0/25 IP multicast address range to be off-limits to customers, and therefore reserved for use as a private multicast domain available only for the service provider's exclusive use. Such exclusive use, of course, includes using this range to implement VPLS multicast. Another method requires all customer wishing to use the administratively scoped address range to obtain their native IP multicast addresses through a dynamic multicast address allocation program, such as multicast backbone session directory (MBONE SDR) or the "host to address allocation server" network protocol (MADCAP), which are known to those skilled in the art. The service provider will statically reserve for VPLS multicast use only a portion of the address space under allocation, e.g., 239.0.0.0/20, and make available the remainder of the range for dynamic allocation to customers through an allocation program. Other schemes that statically or dynamically allocate use of the address range between VPLS multicast use and customer native IP multicast use without conflict may be used in a method of the present invention.

Figure 1:
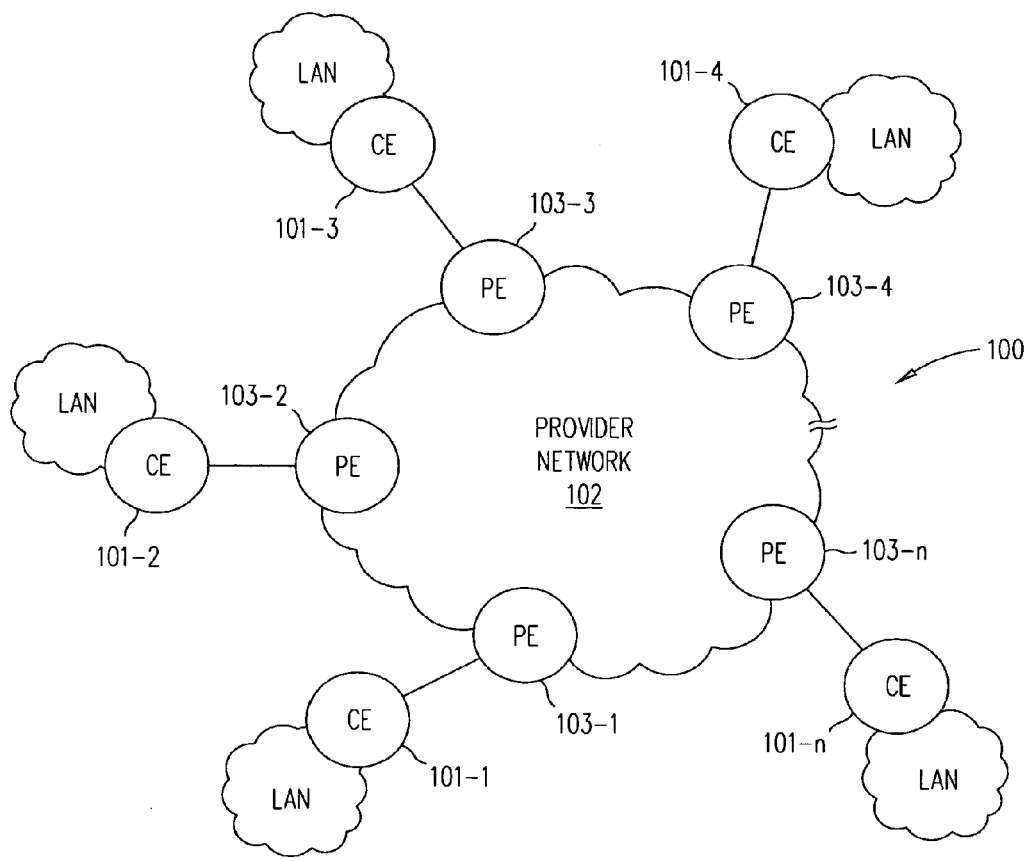
FIG. 1 shows the reference topology of a network that supports a proposed VPLS service.
Figure 2:
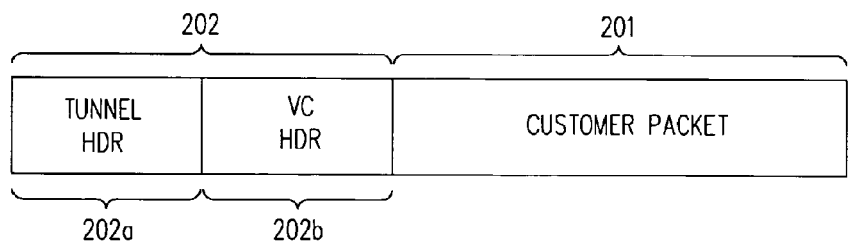
FIG. 2 illustrates a VPLS data packet to be carried over a provider IP/MPLS infrastructure, where customer packet 201 is encapsulated by an MPLS overhead 202, which includes an MPLS tunnel identifier 202a and virtual circuit identifier 202b.
Figure 4:
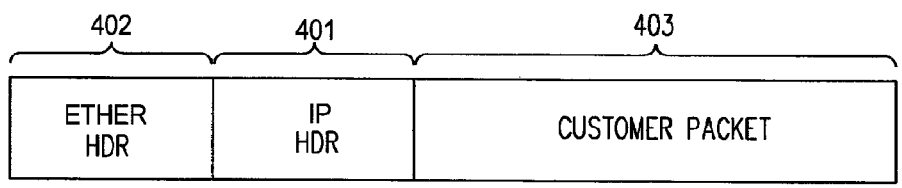
FIG. 4 illustrates a IP-encapsulated customer packet, including IP header 401, Ethernet header 402 and customer packet 403, in accordance with one embodiment of the present invention.

Referring back to FIG. 3, at step 302, when an emulated LAN interface in a VPLS PE device receives either a multicast packet or an unknown unicast packet that requires broadcasting to other PE devices in the same VPLS, rather than providing the MPLS headers to encapsulate the customer packet in the manner shown in FIG. 2, the LAN emulation interface encapsulates the customer packet with the IP header ("IP-encapsulated customer packet"), having as destination address the IP multicast group address associated with the VPLS, and an Ethernet header that includes a multicast Ethernet destination address associated with the IP multicast group address (explained in further detail below). (The IP-encapsulated customer packet is more generally referred as a VPLS multicast packet, where VPLS multicast is implemented piggy-backed on an established multicast protocol, in accordance with the present invention). FIG. 4 shows IP-encapsulated customer packet 400 including IP header 401 and Ethernet header 402, and customer packet 403, in accordance with the present invention. (Alternatively, Ethernet header 402 may include Layer 2 information). Under this format, encapsulated packet 400 can be routed using the well-established IP multicast protocol in the service provider's network, such as illustrated at step 303 of FIG. 3.

To allow the IP multicast group address to be provided in an efficient manner to the PE devices associated with a VPLS, a name service running a domain name system (DNS) type distribution mechanism can be used. For each VPLS, a VPLS identity and a VPLS character string (optional) may be configured with an associated IP multicast group address. Upon joining the VPLS (e.g., a new site is activated), a PE device registers with a name server using a VPLS identity or a character string representing the VPLS. The name server will then associate the IP address of the PE device with the VPLS identity and the IP multicast group address of the VPLS. A similar mechanism for notifying the name server can be provided for a site leaving the VPLS; alternatively, each PE device is required to re-register with the name server after a predetermined "time-to-live" VPLS membership time expires, in order that the list of peer PE devices are current at the DNS server database. Each PE device may periodically check with the DNS server to obtain a list of peer PE devices and the IP multicast group address. When a PE device has a need to forward a customer packet to all peer PE devices, it initiates an IP-encapsulated packet to the IP multicast group address.

Efficient routing of the IP-encapsulated packet can be achieved by running an appropriate routing algorithm in the provider's network. Some algorithm creates efficient multicast distribution trees. For example, a source-base tree protocols, such as PIM-DM or DVMRP, creates a distribution tree for each PE device, with the source PE device being at the root of the distribution tree and all other PE devices of the VPLS at the leaves. Alternatively, if a core-based tree routing protocol, such as PIM-SM, is run in the provider's network, each PE device initiating a multicast sends the IP-encapsulated customer packet to a rendez-vous point (i.e., a "P router"), which then multicasts the IP-encapsulated customer packet to all the other PE devices in the VPLS. Any of these routing protocols will create efficient multicast routes in routing tables at each PE device for packet distribution. According to these multicast routes, a device on the provider's network will provide the next-hop Ethernet address in the Ethernet header in the IP-encapsulated customer packet, according to the rules of IP multicast routing.

Returning to FIG. 3, at step 304, when a PE device receives an IP-encapsulated customer packet, the PE device performs a IP multicast look up to forward the IP-encapsulated packet to one or more other routers according to the distribution tree, as appropriate. At the same time, the PE device checks whether or not the IP multicast group address associated with the IP-encapsulated packet correspond to a VPLS of which it is a member. If so, the PE device strips the IP and Ethernet headers to recover a copy of the customer packet for each CE device of the VPLS attached to the PE device.

To prevent any customer from accidentally or maliciously creating a VPLS multicast packet (e.g., an IP-encapsulated customer packet"), thus inflicting a denial of service (DoS) attack, such a VPLS multicast packet can only be introduced in the provider's network by a VPLS-enabled interface. In effect, an access control list (ACL) is created at each customer facing-port to deny any destination IP address within the providers VPLS multicast address range. Any unauthorized packet is simply dropped at the port.

The present invention is also applicable when the provider's network has a switched core (i.e., the PE devices are interconnected by layer-2 switching devices). In that case, a multicast IP-encapsulated packet is handled by the switched core based on the packet's MAC destination address.

The above detailed description is provided to illustrate the specific embodiments of the present invention and is not intended to be limiting. Numerous variations and modifications within the scope of the present invention are possible. The present invention is set forth in the following claims.

We claim:

1. A network device comprising:
   a processor configured to:
   register the network device with a name server by providing an identity or character string representing a virtual private LAN service (VPLS) of which the network device is a member;
   periodically access the name server to obtain a list of peer devices in the VPLS;
   access the name server to determine an IP multicast group address associated with the VPLS;
   encapsulate a data packet of the VPLS in an Internet Protocol (IP) packet designating the IP multicast group address; and
   transmit the IP packet using an IP multicast routing protocol.

2. The network device of claim 1 wherein the data packet is an Ethernet multicast packet.

3. The network device of claim 1 wherein the data packet is an Ethernet unicast packet including a destination MAC address.

4. The network device of claim 3 wherein the destination MAC address is unknown to the network device.

5. The network device of claim 1 wherein the IP packet includes an Ethernet header that includes a multicast Ethernet destination address associated with the IP multicast group address.

6. The network device of claim 1 wherein the IP multicast routing protocol is a source-based tree protocol or a core-based tree protocol.

7. The network device of claim 1 wherein the VPLS is part of a Layer 2 virtual private network.

8. The network device of claim 1 wherein the IP multicast group address is selected from a private multicast domain, and wherein a portion of the private multicast domain is reserved for VPLS multicast use and a portion is reserved for native IP multicast use.

9. A network device comprising:
   a processor configured to:
   register the network device with a name server by providing an identity or character string representing a virtual private LAN service (VPLS) of which the network device is a member;
   periodically access the name server to obtain a list of peer devices in the VPLS;
   access the name server to determine whether an IP multicast group address associated with a received IP packet corresponds to the VPLS;
   de-encapsulate the IP packet to recover a data packet; and
   transmit the data packet to one or more devices of the VPLS.

10. The network device of claim 9 wherein the processor is further configured to perform a lookup to determine whether the IP packet should be forwarded to zero or more other network devices in a multicast distribution tree.

11. The network device of claim 9 wherein the data packet is an Ethernet multicast packet.

12. The network device of claim 9 wherein the data packet is an Ethernet unicast packet.

13. The network device of claim 9 wherein the IP packet includes an IP header specifying the IP multicast group address as a destination address.

14. The network device of claim 13 wherein the IP packet further includes an Ethernet header specifying a multicast Ethernet destination address associated with the IP multicast group address.

15. The network device of claim 14 wherein de-encapsulating the IP packet comprises stripping the IP packet of the IP header and the Ethernet header.

16. A method comprising:
registering, by a network device, with a name server, the registering being performed by providing an identity or character string representing a virtual private LAN service (VPLS) of which the network device is a member;
periodically accessing, by the network device, the name server to obtain a list of peer devices in the VPLS;
accessing, by the network device, the name server to determine an IP multicast group address associated with the VPLS;
encapsulating, by the network device, a data packet of the VPLS in an Internet Protocol (IP) packet designating the IP multicast group address; and
transmitting, by the network device, the IP packet using an IP multicast routing protocol.

17. A method comprising:
registering, by a network device, with a name server, the registering being performed by providing an identity or character string representing a virtual private LAN service (VPLS) of which the network device is a member;
periodically accessing, by the network device, the name server to obtain a list of peer devices in the VPLS;
accessing, by the network device, the name server to determine whether an IP multicast group address associated with a received IP packet corresponds to the VPLS;
de-encapsulating, by the network device, the IP packet to recover a data packet; and
transmitting, by the network device, the data packet to one or more devices of the VPLS.

18. A non-transitory machine-readable storage medium having stored thereon program code executable by a processor of a network device, the program code comprising:
code that causes the processor to register the network device with a name server by providing an identity or character string representing a virtual private LAN service (VPLS) of which the network device is a member;
code that causes the processor to periodically access the name server to obtain a list of peer devices in the VPLS;
code that causes the processor to access the name server to determine an IP multicast group address associated with the VPLS;
code that causes the processor to encapsulate a data packet of the VPLS in an Internet Protocol (IP) packet designating the IP multicast group address; and
code that causes the processor to transmit the IP packet using an IP multicast routing protocol.

19. A non-transitory machine-readable storage medium having stored thereon program code executable by a processor of a network device, the program code comprising:
code that causes the processor to register the network device with a name server by providing an identity or character string representing a virtual private LAN service (VPLS) of which the network device is a member;
code that causes the processor to periodically access the name server to obtain a list of peer devices in the VPLS;
code that causes the processor to access the name server to determine whether an IP multicast group address associated with a received IP packet corresponds to the VPLS;
code that causes the processor to de-encapsulate the IP packet to recover a data packet; and
code that causes the processor to transmit the data packet to one or more devices of the VPLS.

* * * * *